(12) United States Patent
Thomsen et al.

(10) Patent No.: US 6,272,971 B1
(45) Date of Patent: Aug. 14, 2001

(54) CONNECTING ROD FOR HERMETIC REFRIGERATING COMPRESSOR

(75) Inventors: Jan Thomsen, Aabenraa; Peter Hansen, Broager, both of (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 09/485,474

(22) PCT Filed: Sep. 17, 1998

(86) PCT No.: PCT/DK98/00397

§ 371 Date: Feb. 11, 2000

§ 102(e) Date: Feb. 11, 2000

(87) PCT Pub. No.: WO99/15799

PCT Pub. Date: Apr. 1, 1999

(30) Foreign Application Priority Data

Sep. 19, 1997 (DK) .................................... 1080/97

(51) Int. Cl.[7] .................................... F16C 7/02
(52) U.S. Cl. .............................. 92/84; 74/579 E
(58) Field of Search .................. 92/84, 129; 123/197.3; 74/579 E

(56) References Cited

U.S. PATENT DOCUMENTS

| | | | |
|---|---|---|---|
| 800,592 | * 9/1905 | Phillips et al. | 74/579 E |
| 2,846,897 | * 8/1958 | Schall | 74/579 E |
| 5,140,869 | * 8/1992 | Mrdjenovich et al. | 74/579 E |
| 5,865,092 | * 2/1999 | Woudwyk | 92/216 |

FOREIGN PATENT DOCUMENTS

| | | | |
|---|---|---|---|
| 951201 | * 10/1949 | (FR) | 74/579 E |
| 1193651 | * 11/1959 | (FR) | 74/579 E |
| 1-275949-A | * 11/1989 | (JP) | 74/579 E |

* cited by examiner

*Primary Examiner*—John E. Ryznic
(74) *Attorney, Agent, or Firm*—Lee, Mann, Smith, McWilliams, Sweeney & Ohlson

(57) ABSTRACT

The invention concerns a connecting rod for a hermetic refrigerating compressor, in which the connecting rod forms the mechanical connection between a crank and a piston. The purpose of the invention is to reduce wear in the crank bearing of the compressor with simple means. This is obtained by reducing compressive stresses in the connecting rod by making a cut-out in the connecting rod near the crank bearing. The cut-out causes deflection of compressive stresses, so that they are distributed over a larger share of the crank bearing surface. Also the outer shape of the connecting rod is adapted, so that also here the compressive stresses are distributed over a larger bearing surface. This reduces the wear on the crank bearing of the compressor and increases the life.

8 Claims, 5 Drawing Sheets

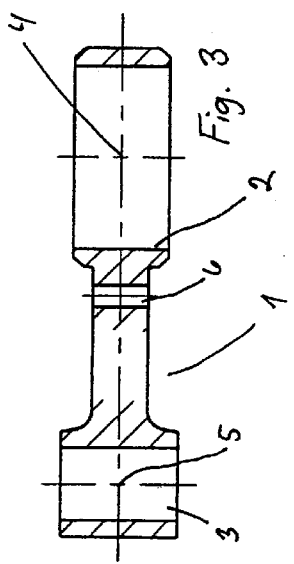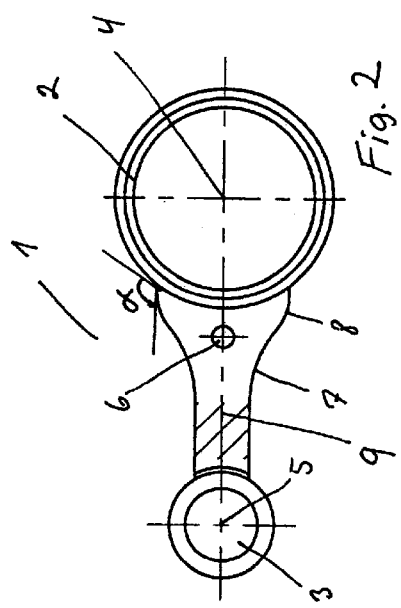

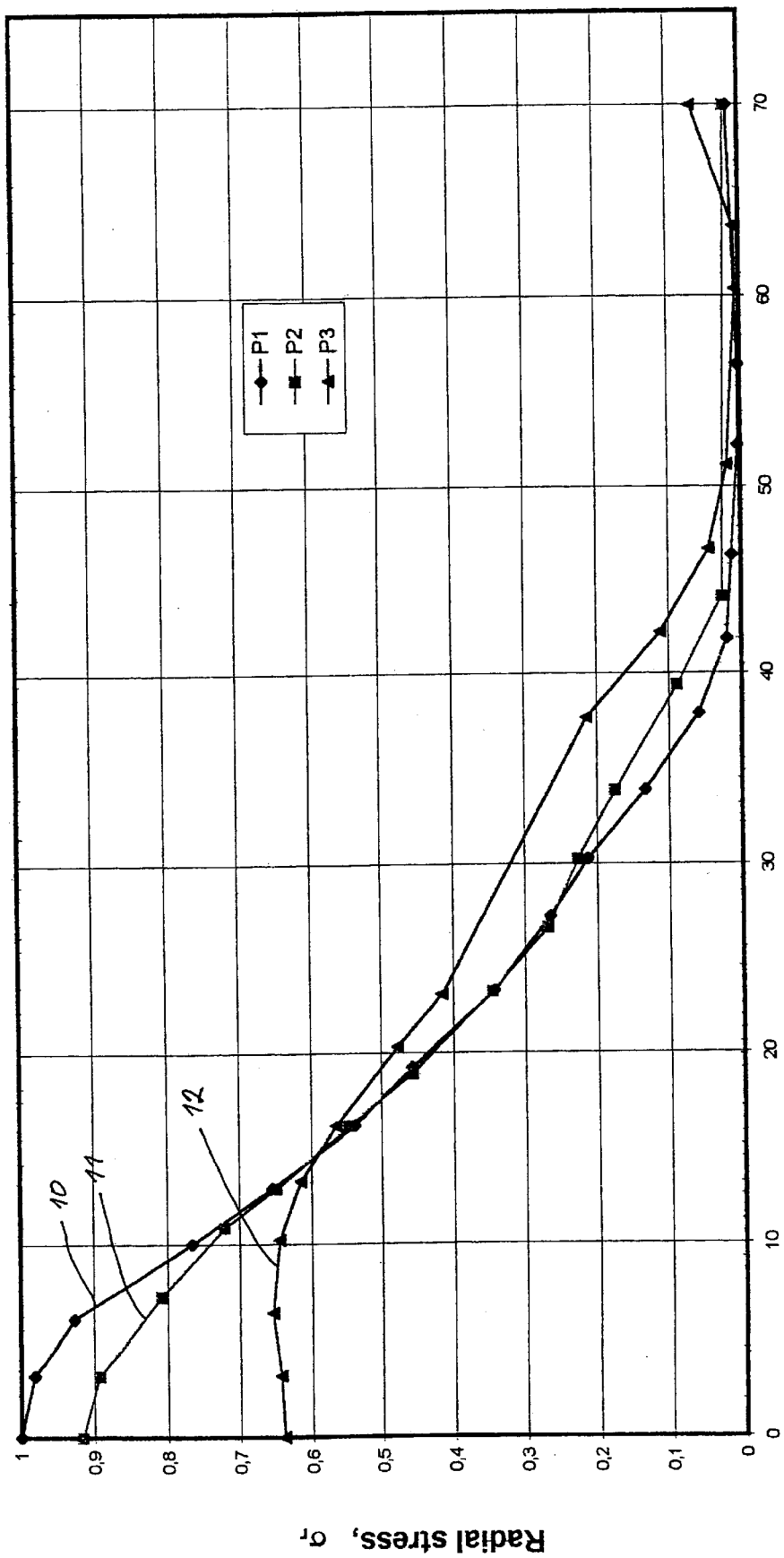

CONNECTING ROD FOR HERMETIC REFRIGERATING COMPRESSOR

The invention concerns a connecting rod for a hermetic refrigerating compressor, in which a shaft is connected with a piston via a crank and a connecting rod, said piston making a forward and back stroke, the connecting rod being connected to the crank by means of a first bearing and the to the piston by means of a connecting link, the connecting rod having means for preventing direct transfer of compressive stress between the common movement centre of the crank and the connecting rod and the common movement centre of the connecting rod and the piston.

U.S. Pat. No. 2,846,897 concerns a connecting rod for a combustion engine, in which the crank bearing comprises two halves assembled with bolts. The connecting rod consists of two longitudinally extending flanges assembled with a central rib. On its transition to the crank bearing the central rib has an arched opening limited on both sides by the longitudinally extending flanges.

DE 32 38 489 A1 also concerns a connecting rod for a combustion engine with a crank bearing comprising a roller bearing, the problem to be solved being to secure the distribution of compressive stresses over several rollers. This problem is solved in that the connection between the bearings of the connecting rod is formed by two flanges, which are mutually connected by a bridge, openings being made between the flanges and the bridge. Thus, it is obtained that compressive stresses are not directly transferred between the movement centres of the connecting rod, and that the stresses are distributed between several rollers. It is also described that the bearing ring is resilient. However, a resilient bearing ring will yield to pressures, when it is not supported by the flanges. Thus, the forces will concentrate at the flanges, and the compressive stresses between the flanges will be substantially reduced. The problem is solved in that with the two flanges the stresses can, in the worst case, run through two rollers.

In both documents mentioned above, the compressive stresses run in the flanges, which are tangentially connected with the bearings. Thus, there is hardly any direct transfer of compressive stresses between the movement centres, and the load on the bearings at the direct connecting line is very small. This gives an increased load of the bearings in other parts of the bearing circumference, where increased wear may cause a reduction of the life. FIG. 1 shows a computer-simulated calculation of compressive stresses in a crank bearing, which is connected with the connecting rod piston bearing by tangentially arranged flanges.

It is the purpose of the invention to realise an increased life of the connecting rod for a hermetic refrigerating compressor using only simple means.

This task can be solved with a connecting rod as described in the introduction, in that the connecting rod is provided with a cut-out, which cut-out is arranged at a distance to the bearing surface of the first bearing, the distance amounting to 15% to 30% of the diameter of the first bearing, the relation between the area of the first bearing opening and the area of the cut-out being 0.1% to 5%.

This gives an even distribution of the compressive stress over a larger share of the bearing surface, which results in reduced wear on the connecting rod crank bearing. Only an adaptation of both placing and size of the cut-out will give an optimum solution. If overcompensating, a drop may occur at the direct connecting line between the movement centres of the connecting rod, and at the same time two new stress concentrations giving wear problems may occur.

Advantageously, the invention can be made so that the largest transverse measure of the cut-out is 5% to 15% of the inner diameter of the first bearing of the connecting rod. This will give a relief of compressive stresses without causing the formation of new pressure peaks with distance to the plane of symmetry.

Advantageously, the outer contour of the connecting rod around the cut-out is formed by a first concave line, which extends into a second convex line. Thus, the compressive stresses can run along the outside of the connecting rod without being deflected by sharp edges.

Advantageously, the material surrounding the cut-out facing the outer contour is thicker than the largest transverse measure of the cut-out. Thus, the compressive stresses can be distributed over a larger angle.

Advantageously, the cut-out is arranged at a distance from the circumference of the first bearing, which distance is larger than the largest transverse measure of the cut-out. Thus, compressive stresses are enabled to act directly under the bore.

Advantageously, the convex line of the outer contour forms an angle $\alpha$ with the outer ring of the first bearing. Thus, production conditions are considered, if the connecting rod has to be made as a sintering workpiece. The angle may also be necessary out of regard for the room in a hermetic compressor.

Advantageously, the cut-out is arranged on the connecting rod in a position displaced to one of the sides in relation to the direct connecting line between the centres of the bearings. Thus, a reduction of the peak of the compressive stresses can be obtained. A friction in the connecting rod bearings may cause a displacement of the compressive stresses from the symmetry line of the connecting rod in the direction of the edge of the connecting rod. To ensure a reduction of compressive stresses, the optimum arrangement and the shape of the cut-out can be calculated to be displaced in relation to the symmetry line. The outer shape of the connecting rod can also be optimised in a way that the sides of the connecting rod deviate from each other.

In the following the invention is explained on the basis of drawings, showing:

FIG. 1 a computer calculated curve of the compressive stresses of the state of the art FIG. 2 a top-view of the connecting rod FIG. 3 a section through the connecting rod FIG. 4 a section of a connecting rod for a hermetic compressor from the state of the art FIG. 5 a section of a connecting rod with changed outer contour FIG. 6 a section of a connecting rod with changed outer contour and a through-going cut-out.

FIG. 7 curves of the radial load for the FIGS. 4, 5 and 6

FIG. 8 a top view of a connecting rod, the cut-out being shown as an ellipse displaced from the symmetry line of the connecting rod FIG. 9 a section through the connecting rod from FIG. 8.

FIG. 1 shows a computer-simulated graph of radial stresses, recorded across a connecting rod as described in DE 32 38 489 A1. As the connecting rod is symmetrical, the computer calculation has been made with an increasing angle from the symmetry plane of the connecting rod. Thus, the curve only shows compressive stresses on one side of the common connecting line of the rotational points. FIG. 1 clearly shows that the maximum compressive stresses are displaced by 40° in relation to the symmetry plane of the connecting rod. FIG. 1 shows a clear overcompensation, as the radial stress has been reduced to about 10% in areas around the symmetry plane, whereas the curve has a maximum at 40°, and as here the curve is symmetrical around 0°, it appears that two new peaks of radial stress occur.

FIG. 2 shows a connecting rod 1 for a hermetic refrigerating compressor. The connecting rod has a first bearing 2, forming a bearing together with the crank, the connecting rod and the crank having a common movement centre 4. The connecting rod also has a second bearing 3 forming the connecting link to a piston (not shown), a common movement centre 5 existing between the connecting link and the connecting rod. The connecting rod is shown with a through-going cut-out 6, here shown as a circular hole. The outer contours comprising a first concave line 7 extending into a convex line 8 are also shown. Further, it is shown that the through-going cut-out 6 is arranged on the symmetry line 9 of the connecting rod. On transition into the bearing 2, the convex line 8 forms an angle α.

FIG. 3 shows a section through FIG. 2 along the symmetry plane 9. It appears from FIG. 3 that the cut-out 6 is formed by a through-going circular hole.

Figure 6:
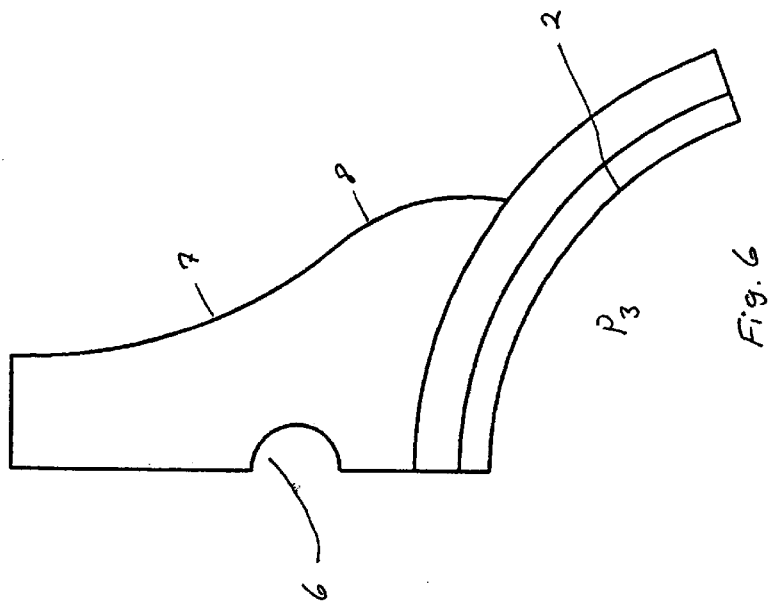
Figure 5:
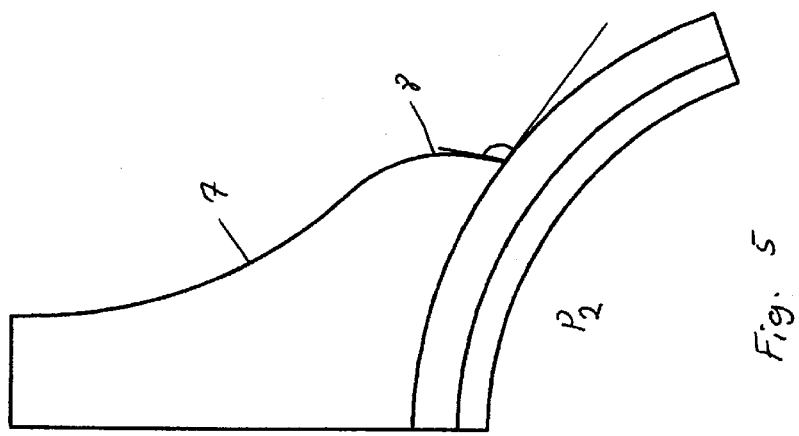
FIG. 5 shows a section similar to that in FIG. 4, the outer contours of the connecting rod having been corrected by the first concave line 7, which extends into a convex line 9, which ends with an angle a against the outer surface of the bearing.

FIG. 6 also shows a section of a connecting rod with the same outer contours as in FIG. 5, here with a through-going cut-out 6.

Figure 1:
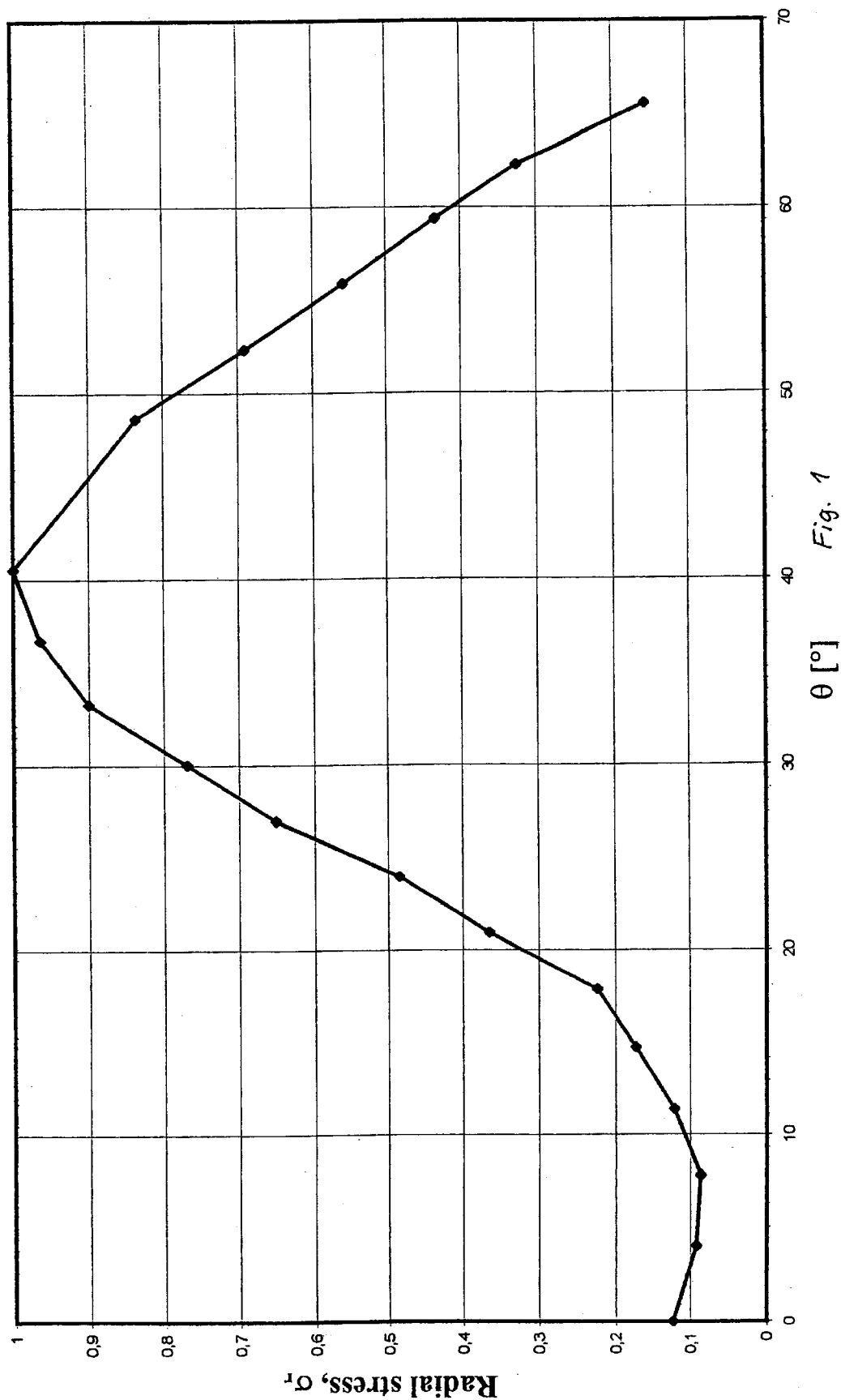

FIG. 7 shows the curves 10, 11 and 12, which have been computer calculated in the same way as the curve in FIG. 1. The curve 10 corresponds to a connecting rod as shown in FIG. 4, whereas the curve 11 corresponds to a connecting rod as shown in FIG. 5, and the curve 12 corresponds to the connecting rod shown in FIG. 6.

Figure 4:
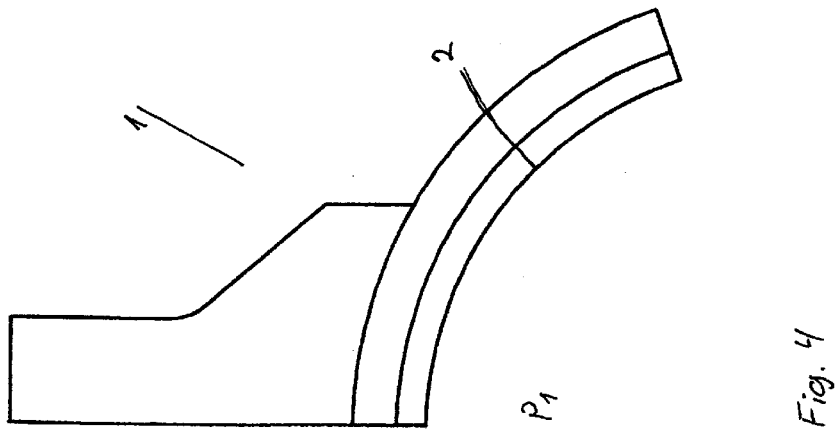
FIG. 4 shows a section of a connecting rod for a hermetic refrigerating compressor according to the state of the art.

Practical use of a connecting rod as shown in FIGS. 4 and 7, curve 10, will cause wear on the surface of the crank bearing 2 (FIG. 2), where the direct connecting line between the two movement centres crosses the bearing surface. In FIG. 7, the maximum radial stress is stated to have the value 1. In curve 11, corresponding to FIG. 5, this value has been reduced to about 0.93, and curve 12 shows a further reduction, namely to 0.64 when using the connecting rod as shown in FIG. 6.

The height of the curve 12 has been reduced, and at the same time it has been moved outwards, so that the radial load on the bearing is distributed on a relatively larger share of the bearing circumference. Thus, the compressive stresses are distributed on a larger share of the bearing circumference, and wear on the bearing at the connecting line between the common movement centres of the connecting rod is avoided.

Figure 8:
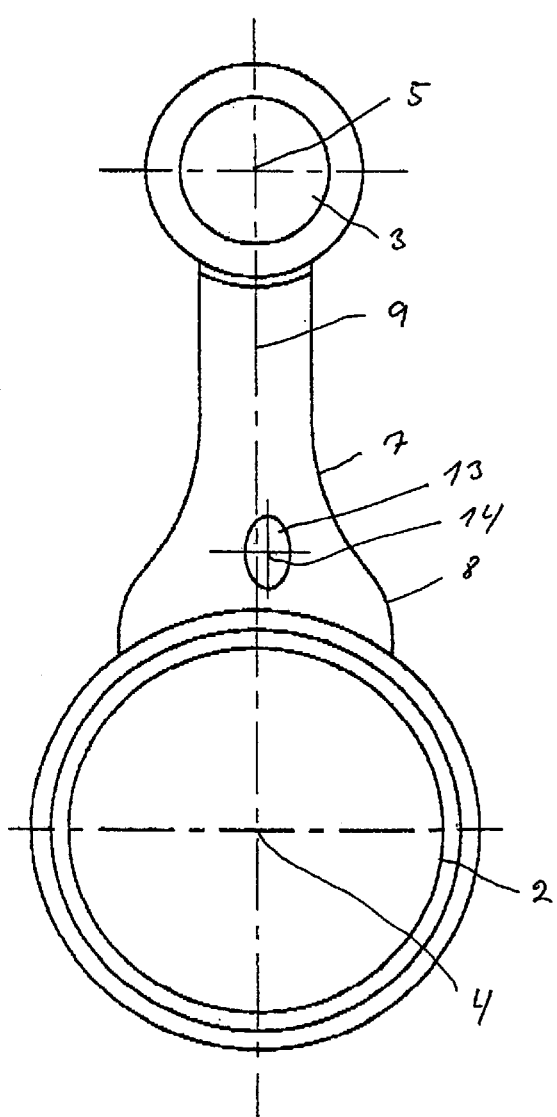
Figure 9:
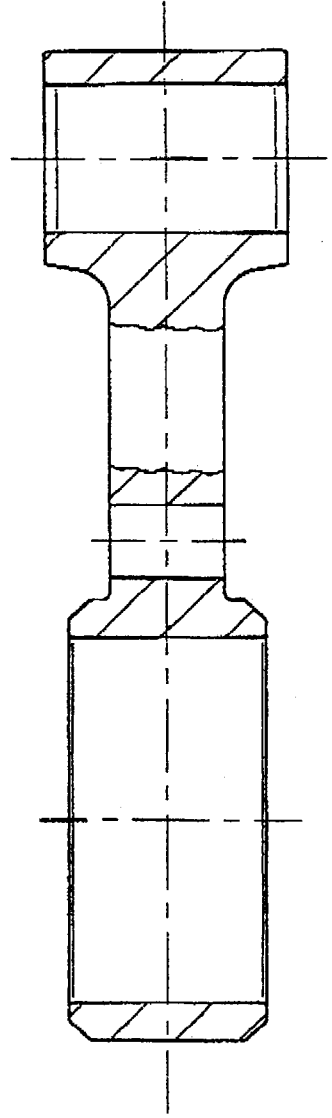

FIGS. 8 and 9 show an alternative embodiment with a cut-out 13 shown as an ellipse displaced from the symmetry line of the connecting rod. Frictional forces from the bearings of the connecting rod may act upon the longitudinal compressive stresses of the connecting rod in a way that they extend in a position displaced from the connecting line of the movement centres. Thus, an asymmetric arrangement of the cut-out may be expedient.

An alternative embodiment with the same effect can be obtained with a non through-going cut-out, and particularly, if the connecting rod is produced by means of sintering, it can be made with a non through-going cut-out. Further, the desired effect can be obtained with cut-outs from both sides with a wall between the cut-outs. The invention can also be made with several cut-outs from both sides.

What is claimed is:

1. Connecting rod for a hermetic refrigerating compressor, in which a shaft is connected with a reciprocating piston via a crank and the connecting rod, the connecting rod comprising a first bearing for connection to the crank, the first bearing having a bearing surface and a predetermined diameter, the connecting rod further comprising a connecting link for connection to the piston, and an intermediate portion connecting the first bearing and the connecting link, the connecting rod having means for preventing direct transfer of compressive stress between a common movement centre of the crank and the connecting rod and a common movement centre of the connecting rod and the piston, the connecting rod also having a cut-out in the intermediate portion, the intermediate portion having an entire solid structure with substantially uniform thickness, the cut-out being arranged at a distance from the bearing surface of the first bearing, the distance amounting to 15–30% of the diameter of the first bearing, and the cut-out having an area and the first bearing opening having an area, the areas having a relation of 0.1–5%.

2. Connecting rod according to claim 1, in which the cut-out has a largest transverse measure of 5% to 15% of the diameter of the first bearing of the connecting rod.

3. Connecting rod according to claim 1, in which the connecting rod has an outer contour around the cut-out formed by a first concave line which extends into a second convex line.

4. Connecting rod according to claim 3, in which the material surrounding the cut-out facing the outer contour is thicker than the largest transverse measure of the cut-out.

5. Connecting rod according to claim 3, in which the convex line of the outer contour forms an angle α with the outer ring of the first bearing.

6. Connecting rod according to claim 5, in which the angle a is between 90 and 180 degrees.

7. Connecting rod according to claim 1, in which the cut-out is arranged at a distance from the circumference of the first bearing, which distance is larger than the largest transverse measure of the cut-out.

8. Connecting rod according to claim 1, in which the cut-out is arranged on the connecting rod in a position displaced to one of the sides in relation to a direct connecting line between the centre of the first bearing and the connecting link.

* * * * *